United States Patent [19]
Levy

[11] Patent Number: 4,870,117
[45] Date of Patent: Sep. 26, 1989

[54] FILLED CABLES

[75] Inventor: Alvin C. Levy, Atlanta, Ga.

[73] Assignee: American Telephone and Telegraph Company, AT&T Bell Laboratories, Murray Hill, N.J.

[21] Appl. No.: 166,793

[22] Filed: Mar. 3, 1988

Related U.S. Application Data

[63] Continuation-in-part of Ser. No. 907,287, Sep. 12, 1986, abandoned.

[51] Int. Cl.$^4$ .............................................. C08G 18/14
[52] U.S. Cl. .................................. 523/173; 174/23 R; 174/23 C
[58] Field of Search ........................... 174/23 R, 23 C; 523/173

[56] References Cited

U.S. PATENT DOCUMENTS

| | | | |
|---|---|---|---|
| 3,879,575 | 4/1975 | Dobbin et al. | 174/23 C |
| 4,259,540 | 3/1981 | Sabia | 174/23 C |
| 4,361,507 | 11/1982 | Bourland | 174/23 R |
| 4,497,538 | 2/1985 | Patel . | |
| 4,509,821 | 4/1985 | Stenger | 523/173 |

FOREIGN PATENT DOCUMENTS 2092176  11/1984  United Kingdom .

Primary Examiner—Joseph L. Schofer
Assistant Examiner—Peter D. Mulcahy
Attorney, Agent, or Firm—Edward W. Somers; J. F. Spivak

[57] ABSTRACT

A waterproof cable having a filling material for filling voids in the cable which comprises a styrene-rubber diblock copolymer, a styrene-rubber-styrene triblock copolymer a paraffinic oil, a polybutene oil and a polyethylene wax. The cable is suitable for aerial use as well as underground use.

16 Claims, 1 Drawing Sheet

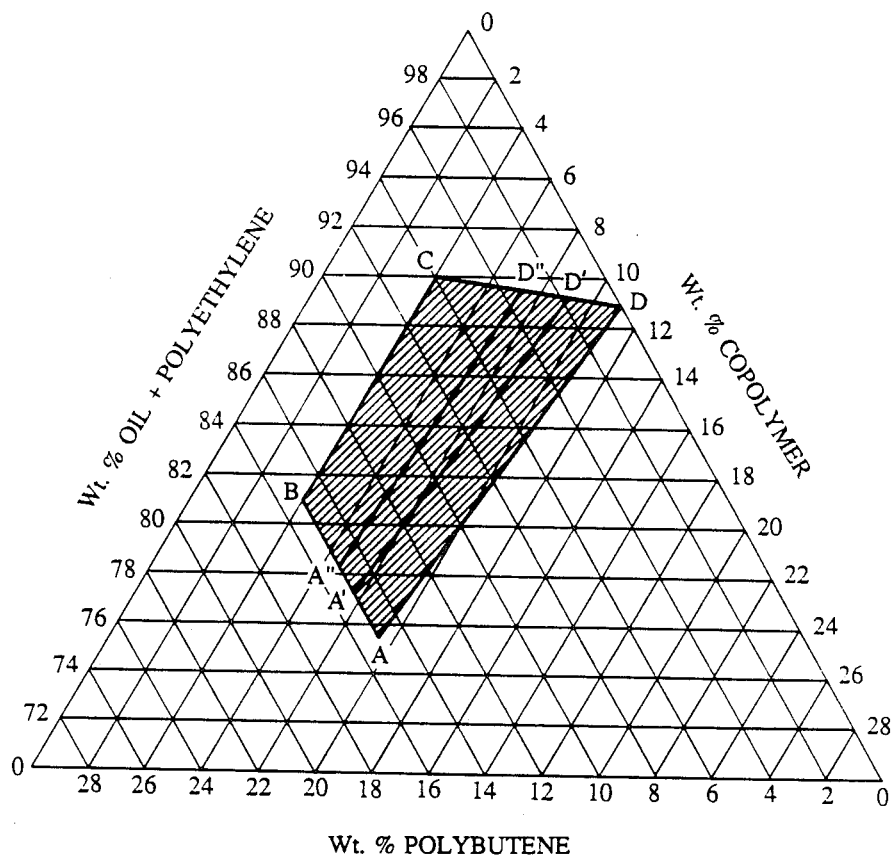

FILLED CABLES

This application is a continuation-in-part of application Ser. No. 907,287, filed Sept. 12, 1986, now abandoned.

TECHNICAL FIELD

This invention relates to cables having a waterproofing filling material therein.

BACKGROUND OF THE INVENTION

Cable used in the telecommunications industry, such as in telephone systems, generally requires a waterproofing filling material in the cable to protect the cable from water entry. This is true whether the cable is buried beneath the ground or laid under water. It is also sometimes required in aerial applications.

Attempts to waterproof cable such as buried cable began nearly 100 years ago and were unsuccessful in a practical sense until the introduction of plastic insulated cable during the 1950's. Specially sheathed cables, with dual plastic coatings encasing an aluminum shield, have been used successfully and are still being buried in dry environments. Pressurized cable also contends successfully with water problems. However, both of these approaches are deficient, the former leaves the cable vulnerable and the latter is expensive to maintain. Since 1970, large quantities of cable have been filled with waterproofing compounds. This approach followed the recognition that in plastic insulated cable the localized intrusion of water into the cable sheath is not in itself a serious problem. Disruption of deterioration of service occurs when long lengths of cable become flooded. Flooding occurs because water that penetrates into a localized opening in the cable sheath is free to channel as far as gravity allows, often hundreds of feet. Not only does this upset the capacitance balance of the transmission lines, but it introduces more potential corrosion sites in proportion to the length of wire that is wetted. Corrosion typically occurs slowly, but the useful life of water soaked wires is obviously shorter than that of dry wires.

A solution that has been widely adopted is to fill the voids in the cable with a water insoluble filling material that simply plugs the cable to channeling water. However, though the physical function of the cable filling material is straightforward, the choice of the material is not. Among the many considerations that are important for materials used in this application are the hydrophobic nature of the material, stability on aging, low temperature properties, flow characteristics at elevated temperatures, processing characteristics, handling characteristics, dielectric properties, toxicity and cost.

Materials that satisfy most of these criteria, and which have been used widely in this application, are described in U.S. Pat. Nos. 3,607,487 and 3,717,716 issued Sept. 21, 1971 and Feb. 20, 1973, respectively. These materials are essentially a petroleum jelly mixed with a polymer, usually polyethylene, to impart consistency and prevent flowing at warm temperatures.

Similar hydrophobic filling materials have been proposed for filling splice closures. For example, U.S. Pat. No. 3,879,575 issued Apr. 22, 1975 describes a mixture of a low viscosity oil, gelled by a styrene-isoprene-styrene copolymer, again with a polyethylene wax added to impart consistency and reduce slump.

More recently, an improvement over the petroleum jelly-polyethylene wax cable filling material has been disclosed in U.S. Pat. No. 4,259,540 issued Mar. 31, 1981. This patent discloses a material which overcomes the objectionable handling characteristics of the petroleum jelly-polyethylene cable filling material. For example, since installation and maintenance of cables often requires the cable to be spliced, such splicing generally requires the isolation and removal of filling material from individual wires or optical fibers in the splice region where the cables are filled with the petroleum jelly material. Otherwise, an oily interface may form between the wire and the polyurethane material subsequently used to encapsulate (waterproof) the splice. This oily interface can serve as a path for water entry into the splice. This results in soiling hands, equipment and clothing. Moreover, removing just sufficient material to effect the splice is time consuming and the task is generally undesirable. Further, handling low temperatures is significantly more difficult, necessitating on occasion, use of a torch to preheat the cable or the use of solvents to soften the encapsulated core. The improved material described in U.S. Pat. No. 4,259,540 overcomes the aforementioned objections to the cable filled with the petroleum jelly-polyethyene material. The improved material according to the patent is a mixture of a napthenic or paraffinic oil having specific characteristics, a styrene-ethylene butylene-styrene (S-EB-S) triblock copolymer having a styrene-rubber ratio of from about 0.2 to 0.5 and polyethylene having a softening point of 110° C. to 130° C.

It should be noted that the term styrene-rubber ratio, when used herein, refers to the weight ratio of the styrene block to the rubber block in the copolymer. Further, whenever the term S-EB-S is employed, it refers to a triblock copolymer whereas the term S-EB refers to a diblock copolymer.

While the cable in accordance with U.S. Pat. No. 4,259,540 is excellent for use in underground applications, it has certain shortcomings with respect to use for aerial applications. These shortcomings are due generally to compound flow-out of the cable especially where solar heating (up to 80°C.) is a factor. Also, at elevated temperatures, the mutual capacitance between electrical conductors of a typical copper wire cable increases due to migration of the oil component into the cell structure of the conductor insulation which generally consists of foamed polyethylene. While U.K. Patent Application GB No. 2 092 176 A teaches that such cell filling can be prevented by the addition of a polybutene oil, and it is generally known that high temperature flow can be attained by increasing the polyethylene wax level present in such compositions, unfortunately, the addition of polybutene oil and an increase in polyethylene wax level both lead to an increase processing viscosity. High viscosity makes it difficult to penetrate and fill the core of large pair count cable. As a general rule, filling should be done at no higher than about 110° C. to prevent damage of the foamed polyethylene insulation and should have a viscosity of less than about 60 centipoise at that temperature to effect filling of large pair sized cable.

Attempts to lower the viscosity by reducing the rubber content of the S-EB-S copolymer have been unsuccessful because such compounds do not properly gel the oil. That is, a minimum level of S-EB-S, of about 5.0 percent by weight is required. Even at a 5.0 percent by weight S-EB-S level, some slight oil separation (syneresis) is often seen as a result of these problems. In order to control this syneresis, U.S. Pat. No. 4,259,540 teaches that a syneresis inhibitor may be added. Such inhibitors are not necessary with the filling formulations of this invention. Filled cables intended for aerial use have used a blend of petroleum jelly and polyethylene wax. Such cables exhibit the drawbacks of the buried petroleum jelly cables previously discussed.

Applicant has now discovered a filling composition which is a modification of the composition described in U.S. Pat. No. 4,259,540 which is included herein by reference, and which overcomes the problems stated above for aerial use, but yet retains all of the other properties which make the cable suitable for use as buried cable. Consequently, cable using the filling compound as described herein is not only suitable for use as buried cable, but is also suitable for aerial use as well.

SUMMARY OF THE INVENTION

A cable comprises a plurality of strands which may be, for example, insulated electrical wire conductors or optical fiber conductors, contained within a sheath leaving voids between the strands and between the strands and the sheath, and a filling material filling the voids. The invention is characterized in that the filling material comprises a mixture of a styrene-rubber diblock copolymer typically having a styrene/rubber ratio of from about 0.2 to 0.5; an oil such as those defined by ASTM D2226 type 103, 104A, 104B, or mixtures thereof., and polyethylene. Additionally, the filling composition may include a styrene-rubber styrene triblock copolymer and/or a polybutene oil. a styrene-rubber-styrene triblock copolymer The amounts of the foregoing ingredients are formulated in proportions to give a cable filling material that meets the functional requirements for the cable employing such material for both buried and aerial use. The material has high temperature flow, capacitance stability and processing characteristics superior to those of prior art material.

BRIEF DESCRIPTION OF THE DRAWING

The FIGURE is a ternary compositional diagram setting forth composition ranges of the cable filling material which is employed in the novel cable of the present invention.

DETAILED DESCRIPTION

The cable of the present invention is an improvement over the cable disclosed in U.S. Pat. No. 4,259,540 in that it retains all the positive attributes of the prior art cable and yet in addition, has capacitance stability and high temperature flow resistance which are required for aerial use, and further does not exhibit oil separation. In addition, the filling compound for waterproofing of the novel cable is easily injected into the cable.

The filling compound of the novel cable employs a styrene-rubber diblock copolymer to replace all or part of the styrene-rubber-styrene triblock copolymer cited in the '540 patent which is incorporated herein by reference. Applicant has discovered that the prior art rubber, which is capped on both ends by styrene, has a higher physical crosslink density than the styrene-rubber diblock copolymer used in the filling composition of the present invention wherein the rubber has a styrene cap on one end only. The crosslinks are physical in nature and result from separate styrene and rubber block domains which form due to the inherent incompatibility of the two types of blocks. Inasmuch as the styrene blocks are rigid below their Tg of approximately 90° C., they act as physical crosslinks below the styrene Tg where the styrene block is on both ends of the molecule (triblock). Applicant has discovered that this lower physical crosslink density results in the oil, which is incorporated in the composition, to be more effectively gelled. Accordingly, syneresis (separation) and cell filling are significantly reduced or eliminated. Further, one may select a styrene-rubber diblock copolymer which is approximately half the molecular weight of the prior styrene-rubber-styrene copolymer, but yet having approximately e same styrene block to rubber block ratio. T is results in a lower viscosity material which makes it possible to add polybutene oil and polyethylene wax to the filling composition to aid in preventing insulation cell filling and in improving high temperature flow characteristics. Such a lower viscosity material can be obtained by using a low viscosity processing oil but not without incurring an insignificant penalty with respect to parameters such as flash point and volatility. If sufficient styrene-rubber copolymer is used, no polybutene oil addition is necessary. However, since the copolymer is generally more costly than the polybutene oil, from an economic standpoint, it is desirable to use a combination of the two materials to prevent cell filling. However, for spliced encapsulant compatability and the processability of the filling compounds considerations, it is desirable to minimize the polybutene oil level. Hence, depending upon the consideration which is most important to the user, the formulation can be adjusted in various ways. It is apparent that the substitution of the styrene-rubber diblock copolymer for all or part of the styrene-rubber-styrene triblock copolymer of the prior art is extremely desirable.

Even low levels of the styrene-rubber diblock copolymer (about 1%) is found to be particularly useful in formulations which require flame retardant properties where syneresis can be a problem.

Although the use of a diblock copolymer reduces the viscosity, it tends to result in a somewhat greasy material which may not be acceptable to some customers. The increased viscosity is brought on by the triblock copolymer which is used to impart gelness to the filling material. It has been found that a less greasy, reduced viscosity composition can be achieved by reducing the diblock copolymer content and including a lower viscosity oil.

The handleability of the filling compound can be changed by varying the ratio of the diblock copolymer to the triblock copolymer. The higher the diblock copolymer content, the more greasy is the filling compound. On the other hand, a high triblock copolymer content results in a highly gelled filling material. In a preferred embodiment, the ratio by weight percent of the diblock copolymer to the triblock copolymer should be in the range of from about 0.05 to 5.

The improved cable of this invention can generally be described as one comprising a plurality of conductors (electrical or lightguide) contained within a sheath leaving voids between the conductors and/or between the conductors and the sheath, and a filling material filling the voids wherein the filling material comprises a mixture of a styrene-rubber diblock copolymer having a styrene-to-rubber ratio of from about 0.2 to 0.5, a napthenic or paraffinic oil, and polyethylene, and in a preferred embodiment, a styrene-rubber-styrene triblock copolymer with the ratio of the diblock copolymer to the triblock copolymer being that specified hereinbefore. The amounts of the foregoing ingredients are formulated in proportions so as to result in a cable having a filling material that meets the functional requirements previously set forth for both buried and aerial cable. More particularly, the cable will have a temperature flow of at least about 80° C. and a capacitance stability of no greater than 5% increase in the mutual capacitance between insulated conductors at elevated temperature and the composition will have a low viscosity for ease in cable filling.

The styrene-rubber diblock copolymer employed in the cable filling composition is preferably a block copolymer wherein the rubber moiety is saturated. A preferred diblock copolymer is a styrene-ethylene butylene copolymer having a styrene to ethylene butylene ratio of from about 0.2 to 0.5 and preferably in the vicinity of about 0.4. Other rubbers can be substituted for the ethylene butylene block of the copolymer, for example, one may employ ethylene propylene.

The preferred napthenic and paraffinic oils useful in the filling composition are generally described by ASTM specification D2226 as being type 103, 104A, 104B or mixtures thereof. These preferred oils typically have a minimum specific gravity of 0.85, a minimum SUS viscosity at 210oF of 40 as determined in accordance with ASTM specification D2161 and a maximum pour point as per ASTM D97 of 20° F.

The polyethylene which is included in the formulation of the filling material typically has a softening point of 105° C. to 130° C. per ASTM E28.

In addition to the above components, the composition may include a styrene-rubber-styrene triblock copolymer such as a styrene-ethylene butylene-styrene copolymer having a styrene-to-rubber ratio of approximately 0.2 to 0.5 and preferably about 0.4 or other styrene-rubber-styrene copolymers wherein the rubber may be, for example, an ethylene propylene. It should be noted that the styrene in any of the aforementioned diblock copolymers includes substituted styrenes. Other additives which may be included in the formulation are polybutene oils or the like.

Various oil-polymer mixtures were formulated in arriving at the ingredients described above and their preferred proportions. The preferred proportions for a formulation wherein the styrene-rubber component is a styrene-ethylene butylene diblock copolymer are indicated in the shaded area bounded by lines connecting points A, B, C, and D of the FIGURE. The preferred proportions when using copolymer mixture having a 70/30 weight ratio of S-EB/S-EB-S is given by the boundary formed by A'BCD'. Similarly, the preferred proportions when using a 40/60 mixture of S-EB/S-EB-S is given by A"BCD". The parameter giving the weight percent oil and polyethylene wax includes 6-7% polyethylene wax Hence, 90% oil and polyethylene represents 83-84% oil and 6-7% polyethylene wax. The lines AB, A'B, and A"B represent bounds set by encapsulant compatibility. By encapsulant compatibility, it is meant that there is no oil separation at the encapsulant wire interface. This shows a maximum amount of polybutene in the formulation of 15 weight percent. The particular polybutene oil represented in the FIGURE had a molecular weight of 1290. However, polybutene oils of other molecular weights are suitable. The preferred molecular weight range for the polybutene oil is from about 300 to 2,000. The line, BC, represents the minimum amount of the styrene-rubber needed to properly gel the structure and control oil syneresis. As can be seen, this minimum amount of styrene-rubber diblock copolymer is 4 weight percent. The lines CD, CD', and CD" represent the boundary for mutual capacitance stability, that is, a capacitance which does not vary in an amount of greater than 5%. Further, lines AD, A'D' and A"D" are the bounds for maximum preferred viscosity of about 60 centipoise. Variation of the ratio of styrene-ethylene butylene diblock copolymer to styrene-ethylene butylene-styrene triblock copolymer ill change the area bounded such as by moving from AD to A"D". Similarly, a change in the molecular weight of any of the components and the type of oil or melting point of the wax may also shift these bounds. Hence, the FIGURE depicts he preferred compositional ranges for the particular combination of materials as set forth with respect to the FIGURE. However, these ranges are generally typical to what one would expect even when substituting other suitable polymers or components. While in all of these compositions, polyethylene wax comprises from 6-7% of the composition, a range of about 4-12% of polyethylene wax is useful. This extended range of polyethylene will cause some shifting of the boundaries depicted in the FIGURE. The shift will be a shift of the AD line of the FIGURE whereby lower amounts of polyethylene will lower the AD line to give a broader range and vice versa. Some of the test data used to arrive at the preferred compositional formulations is given in the following Table.

TABLE

| Constituents | Description |
| --- | --- |
| A | Styrene-ethylene butylene-styrene triblock copolymer (S-EB-S) having the following properties: styrene/rubber ratio 0.4: sp. gr. 0.91; percent elongation 500; 300 percent modulus ASTM (D412) 700-800 psi; 25° C. viscosity, 20 percent in toluene, 400-525 cps (Brookfield Model D RVT, No. 21 spindle). Available from Shell Chemical Co. under the trade designation Kraton G 1652. |
| B | Styrene-ethylene butylene diblock copolymer (S-EB) having a styrene/rubber ratio from 0.4; sp. gr. 0.91; approximately one half the molecular weight of the above-mentioned Kraton G 1652 molecule. Available from Shell Chemical Co. under the designation TRW-7-1511. |
| C | A 30/70 by weight ratio of constituents A and B, having a percent elongation of 200 and a 25° C. viscosity, 25 percent by weight in toluene |

TABLE-continued

| | | |
|---|---|---|
| | D | of approximately 200 centipoise. Available from Shell Chemical Co. under the trade designation Kraton G 1726. |
| | D | Paraffinic based processing oil, type 104B per ASTM D2226, having a pour point per ASTM D97 of 0° F.; SUS viscosity at 210° F. of 47, sp. gr. 0.86. Available from Sun Chemical Co. under the trade designation Sunpar LW 120. |
| | E | Polyethylene wax having a softening point per ASTM E28 of 117° F.; a hardness per ASTM D5 of 0.5 dmm; density per ASTM D1505 of 0.94, viscosity at 140° C. of 400–450 centipoise. Available from Allied Chemcial Co. under trade designation AC9. |
| | F | Polybutene oil having a viscosity at 99° C. per ASTM D445 of 635–690 cSt; a pour point per ASTM 97 of +35° F.; and average molecular weight of 1290. Available from Amoco Chemical Co. under trade designation Indopol H300. |

| Example No. | Composition parts by weight | Viscosity at 110° C. cps | Minimum slump temp. °C. | Capcitance change % | Encapsulant pull-out force, lbs. Cable | Hand Dip |
|---|---|---|---|---|---|---|
| 1 | A-5.5 E-5 D-89 | 35 | 70 | 13 | 12 | 12 |
| | 0.5 isopropyl phenyl-phenylphthalate | | | | | |
| 2 | C-5.5 E-8 D-86.5 | 26 | ≧85 | — | — | — |
| 3 | A-4 B-11 D-85 | — | — | 2.7 | — | — |
| 4 | A-2.7 C-4.3 E-5 D-88 | 38 | 75 | 9.4 | — | — |
| 5 | C-4.5 E-7 F-15 D-73.5 | 33 | ≧85 | 2.5 | — | — |
| 6 | C-5.5 E-7 F-15 D-72.5 | 39 | 85 | — | — | — |
| 7 | C-4.5 E-7 F-10 D-78.5 | 28 | 85 | 3 | — | — |
| 8 | A-1 C-4 E-7 F-10 D-78 | 34 | 85 | 2.7 | 10 | 6.5 |
| 9 | B-11 E-7 D-82 | 60 | — | — | — | — |
| 10 | A-1.5 C-4 E-6.5 F-4 D-84 | 32 | — | 6.8 | — | — |
| 11 | A-1.5 C-4 E-6.5 F-7 D-81 | 35 | 85 | 4.6 | — | 10 |
| 12 | A-5.0 C-0.5 E-7.0 F-7.0 G-80.5 | 40 | 85 | 2 | — | 14 |
| 13 | A-5.0 C-0.5 E-7.0 F-5.0 D-82.5 | 40 | 85 | — | — | — |
| 14 | A-4.5 C-1.0 E-6.5 F-5.0 D-83.0 | 45 | 85 | | | |
| 15 | A-2.5 C-3.0 E-6.5 F-7.0 D-81.0 | 35 | 85 | | | |

Paraffinic based processing oil, type 104B per ASTM D 2226, having a pour point per ASTM D 97 of 0° F., SUS viscosity at 210° F. of 40, sp. gr. 0.855. Available from Sun Chemical Co. under the trade designation Super LW 110, Shell Chemical Co. under the trade designation Shellflex 210. and Atlantic Richfield Co. under the trade designation Tufflo 10.

Of the examples provided in the foregoing table, Example 12 is preferred from the standpoint of acceptability to most customers. However, there may be some applications where the customer may desire another of the Example compositions of the claimed invention.

All 0.2 to 0.4 parts by weight of an antioxidant such as Irganox 1010 or Irganox 1035 marketed by Ciba-Geigy Corp.

The various compositions were evaluated in terms of five major considerations. These are viscosity, resistance to high temperture flow (slump), capacitance stability, compatibility with urethane type encapsulants and low temperature penetration.

The viscosity measurement indicates the processability of the material. Cables are filled by injecting the filling material into the voids between the wire pairs. Typically, in copper wire cable, this is done after forming a unit of wires or on cable cores consisting of a number of units. Therefore, it is important that the material have a proper viscosity. The filling process involves elevated temperature. From the standpoint of the processing equipment and the effectiveness of the filling process it is more desirable to lower the viscosity of the filling material than to raise the temperature. The operating temperature is limited to the vicinity of 110° C. by the insulation commonly used. Therefore, further variation is obtained by choice of the composition. A maximum of 60 centipoise at 110° C. has been imposed on the composition for acceptable processing.

The second criteria appearing in the Table is the slump charcteristics after two hours exposure to elevated temperatures. This is a measure of the ability of the filling material to retain an acceptably rigid state at elevated service temperatures. Mechanical data is also presented for some examples. A minimum temperature of 80° C. has been imposed on the cable for slump.

The test for capacitance stability involves immersion into a beaker of filling compound of a twisted pair of 22 gauge copper wire having insulation thereover consisting of an inner layer of foamed polyethylene and an outer skin of unfoamed polyethylene. This test set-up is heated to 60° C. in an oven and the capacitance between wires in the pair and capacitance to ground are monitored as a function of time. Passage of the test requires a maximum increase in the average of the two measurements of not greater than 5% at 100 days exposure. One hundred days at 60° C. has been found to correspond to approximately 20 years exposure of aerial cable installed in the Arizona desert.

For the encapsulant compatibility test, insulated conductors having a layer of filled compound are potted in a test fixture with a urethane encapsulant used to fill splice cases. Two thicknesses of filling compound are tested; one characteristic of wire removed from cable and a second thicker layer obtained by a hand dip of the wire in 110° C filling compound. The force required to remove the wire from the test fixture is then measured. The greater the pull-out force, the better the barrier to water penetration at the wire/encapsulant interface. Passage of this test requires a value of a minimum of a four pound pull-out force on wires removed from cable.

Low temperature penetration is measured at 72° F. and 0° F. using ASTM D937. Passage requires performance comparable to the prior art materials. Typical values for both prior art formulations (U.S. Pat. No. 4,259,540) and formulations in accorgance with this invention are 120–150 dmm at 72° F. and 60–90 at 0oF As a point of reference, a polyethylene/petroleum jelly blend used in aerial cable was measured as having a penetration of 19 dmm at 0° F. The lower the penetration number the greater the stiffness of the material.

Although this description deals with primarily electrical cables, it is evident to those skilled in the art that it is equally applicable to cables containing light conductors.

For comparison purposes, Example 1 of the Table, is a filling composition for a cable in with the prior art (U.S. Pat. No. 4,259,540) wherein the rubber material is a styrene-ethylene butylene-styrene triblock copolymer and the filling composition contains no styrene-ethylene butylene diblock copolymer. It can be seen that the capacitance change is significantly higher than the 5% maximum allowed as the standard and further that the slump temperature is well below the 80° minimum temperature set for the slump.

What is claimed is:

1. A cable comprising a plurality of conductors contained within a sheath leaving voids between the conductors and/or between the conductors and the sheath and a filling material filling said voids, the invention characterized in that said filing material comprises a mixture of a styrene-rubber diblock copolymer, wherein the styrene block comprises a styrene homopolymer, wherein the rubber block comprises a saturated olefin copolymer and wherein said styrene-rubber diblock copolymer has a styrene/rubber ratio of from about 0.2 to 0.5, a compatible oil and polyethylene in proportions to give a cable filling material having a viscosity which facilitates ease in cable filling and being such that the cable has a mutual capacitance stability of no greater than 5% increase in capacitance.

2. A cable comprising a plurality of conductors contained within a sheath leaving voids between the conductors and/or between the conductors and the sheath and a filling material filling said voids, the invention characterized in that said filling material comprises a mixture of a styrene-rubber diblock copolymer, a compatible oil and polyethylene in proportions to provide a cable filling material having a viscosity which facilitates ease in cable filling and being such that the cable has a mutual capacitance stability of no greater then 5% increase in capacitance, and wherein the styrene-rubber diblock copolymer has a styrene-rubber ratio of from about 0.2 to 0. 5 and the oil is at least one oil selected from those oils falling within ASTM D2226, types 103, 104A and 104B.

3. The cable recited in claim 2, wherein said oil is selected from the group consisting of naphthenic oils, paraffinic oils and mixtures thereof and wherein the cable filling material has a minimum flow temperature of about 80° C.

4. The cable recited in claim 1, wherein said styrene-rubber diblock copolymer is a styrene-ethylene butylene diblock copolymer.

5. The cable recited in claim 5, wherein:
said oil has a minimum specific gravity of about 0.85, a minimum SUS viscosity of 210° F. of about 40, and a maximum pour point of about 20° F.; and
said polyethylene has a softening point of from 105° C. to 130° C.

6. A cable comprising a plurality of insulated strands contained within a sheath leaving voids between said strands and/or between said strands and said sheath and a filling material filling said voids, the invention characterized in that said filling material comprises a mixture of:
a styrene-rubber diblock copolymer having a styrene/rubber ratio of from about 0.2 to 0.5 wherein the styrene block of said diblock copolymer comprises a styrene homopolymer and wherein the rubber block of said diblock copolymer comprises a saturated olefin copolymer;
a styrene-rubber-styrene triblock copolymer having a styrene/rubber ratio of from about 0.2 to 0.5 wherein the ratio by weight percent of the diblock copolymer to the triblock copolymer is in the range of from about 0.5 to about 5;
a compatible oil; and
from about 4–12% polyethylene having a softening point of from 105° C. to 130° C., said cable filling material having a flow temperature of at least 80° C., and said cable having a mutual capacitance stabiltiy of no more than 5% increase in capacitance and wherein the filling material is of a viscosity of less than about 60 centipoises at the filling tempeture.

7. The cable recited in claim 6, and having a composition within the ranges as set forth within the boundaries A, B, C, and D of the FIGURE.

8. The cable recited in claim 6, wherein the diblock copolymer is a styrene-ethylene butylene copolymer.

9. The cable recited in claim 7, wherein the rubber block of the said block copolymers is an ethylene butylene block.

10. The cable recited in claim 9, having a composition which falls within the boundaries of A, B, C and D of the FIGURE.

11. A cable comprising a plurality of insulated strands contained within a sheath leaving voids between said strands and/or between said strands and said sheath and a filling material filling said voids, the invention characterized in that said filling material comprises a mixture of:

a styrene-rubber diblock copolymer having a styrene-rubber ration of from about 0.2 to about 0.5 wherein he styrene block of said diblock copolymer comprises a styrene homopolymer and the rubber block of said diblock copolymer comprises a saturated olefin copolymer;

a paraffinic oil falling within the class defined by ASTM D2226 type 104B and having an SUS viscosity at 210° F. of 40,;

from about 4–12% polyethylene having a softening point of from 105° C. to 130° C.;

a styrene-rubber-styrene triblock copolymer having a styrene/rubber ratio of from about 0.2 to 0.5, the ratio by weight of diblock copolymer to triblock copolymer being in the range of about 0.05 to about 0.05 to about 5; and a polybutene oil having an average molecular weight of from about 300, to 2,000, said cable having a mutual capacitance stability of no more than 5% increase in capacitance and wherein the filling material is of a viscosity of less than about 60 centipoise at the filling temperature.

12. The cable of claim 1, wherein said mixture includes at least one additive selection from the group consisting of a styrene-rubber styrene triblock copolymer having a styrene/rubber ratio of about 0.2 to 0.5 and a polybutene oil having an average molecular weight of from about 300 to 2,000.

13. The cable of claim 1, wherein said filling material also includes a styrene-rubber-styrene triblock copolymer such that the ratio by weight percent of the diblock copolymer to the triblock copolymer is in the range from about 0.5 to about 5.

14. The cable of claim 13, wherein said filling material also includes from about 4–12% polyethylene having a softening point to from 105° C. to 130° C. and wherein said oil is a mixture comprising a polybutene oil and a paraffinic based processing oil type 104B per ASTM D 2226.

15. The cable of claim 14, wherein said paraffinic oil of said mixture has a SUS viscosity at 210° F. to 40, and the cable filling material has a minimum flow temperature of about 80° C.

16. The cable of claim 7, wherein said oil of said filling material is a mixture comprising a polybutene oil and a paraffinic oil type 104B per ASTM D 2226 having a SUS viscosity at 210° F. of 40.

* * * * *

UNITED STATES PATENT AND TRADEMARK OFFICE
CERTIFICATE OF CORRECTION

PATENT NO. : 4,870,117
DATED : September 26, 1989
INVENTOR(S) : Alvin C. Levy

It is certified that error appears in the above-identified patent and that said Letters Patent is hereby corrected as shown below:

On the title page:

Item [75] Inventors: "Alvin C. Levy, Atlanta."

should read: --Alvin C. Levy, Atlanta; and Ching Fang Tu, Tucker; both of Georgia--

Signed and Sealed this

First Day of January, 1991

Attest:

HARRY F. MANBECK, JR.

*Attesting Officer*    Commissioner of Patents and Trademarks